(12) United States Patent
Troder

(10) Patent No.: US 7,855,338 B2
(45) Date of Patent: Dec. 21, 2010

(54) ELECTRICAL BOX WITH MOVABLE MOUNTING SYSTEM

(75) Inventor: Walter P. Troder, Bryan, OH (US)

(73) Assignee: Allied Moulded Products, Inc., Bryan, OH (US)

(*) Notice: Subject to any disclaimer, the term of this patent is extended or adjusted under 35 U.S.C. 154(b) by 220 days.

(21) Appl. No.: 12/180,031

(22) Filed: Jul. 25, 2008

(65) Prior Publication Data

US 2009/0025953 A1   Jan. 29, 2009

Related U.S. Application Data

(60) Provisional application No. 60/952,364, filed on Jul. 27, 2007.

(51) Int. Cl.
*H02G 3/08* (2006.01)
(52) U.S. Cl. ............... 174/50; 174/53; 174/58; 174/64; 174/135; 439/535; 248/906
(58) Field of Classification Search .......... 174/50, 174/58, 64, 135, 17, 60, 53; 439/535; 248/906; 33/528; 220/4.02, 3.6, 3.8
See application file for complete search history.

(56) References Cited

U.S. PATENT DOCUMENTS

| | | |
|---|---|---|
| 4,093,326 A | 6/1978 | Ford |
| 5,000,607 A | 3/1991 | Parlatore et al. |
| 5,088,839 A | 2/1992 | Tsukada |
| 5,744,753 A | 4/1998 | Nattel |
| 6,213,679 B1 | 4/2001 | Frobosilo et al. |
| 6,831,228 B2 | 12/2004 | Lalancette et al. |
| 6,929,140 B2 | 8/2005 | Rose |
| 6,967,284 B1 | 11/2005 | Gretz |
| 7,126,058 B2 | 10/2006 | Herth |
| 7,135,640 B1 | 11/2006 | Ofcharsky et al. |
| 7,173,184 B2 | 2/2007 | Hull et al. |
| 7,179,993 B2 | 2/2007 | Rose |
| 7,214,875 B1 | 5/2007 | Gretz |
| 7,307,213 B1 | 12/2007 | Gretz |
| 7,378,590 B1 * | 5/2008 | Herth ............ 174/50 |
| 2005/0051546 A1 | 3/2005 | Dinh |
| 2006/0108362 A1 | 5/2006 | Lalancette |
| 2007/0045308 A1 | 3/2007 | Lalancette et al. |

* cited by examiner

*Primary Examiner*—Dhiru R Patel
(74) *Attorney, Agent, or Firm*—Fraser Clemens Martin & Miller LLC; J. Douglas Miller

(57) ABSTRACT

An electrical box is disclosed, wherein the electrical box includes a mounting system that facilitates a repositioning of the electrical box on a mounting structure without a complete removal of fastening devices from the mounting structure.

18 Claims, 7 Drawing Sheets

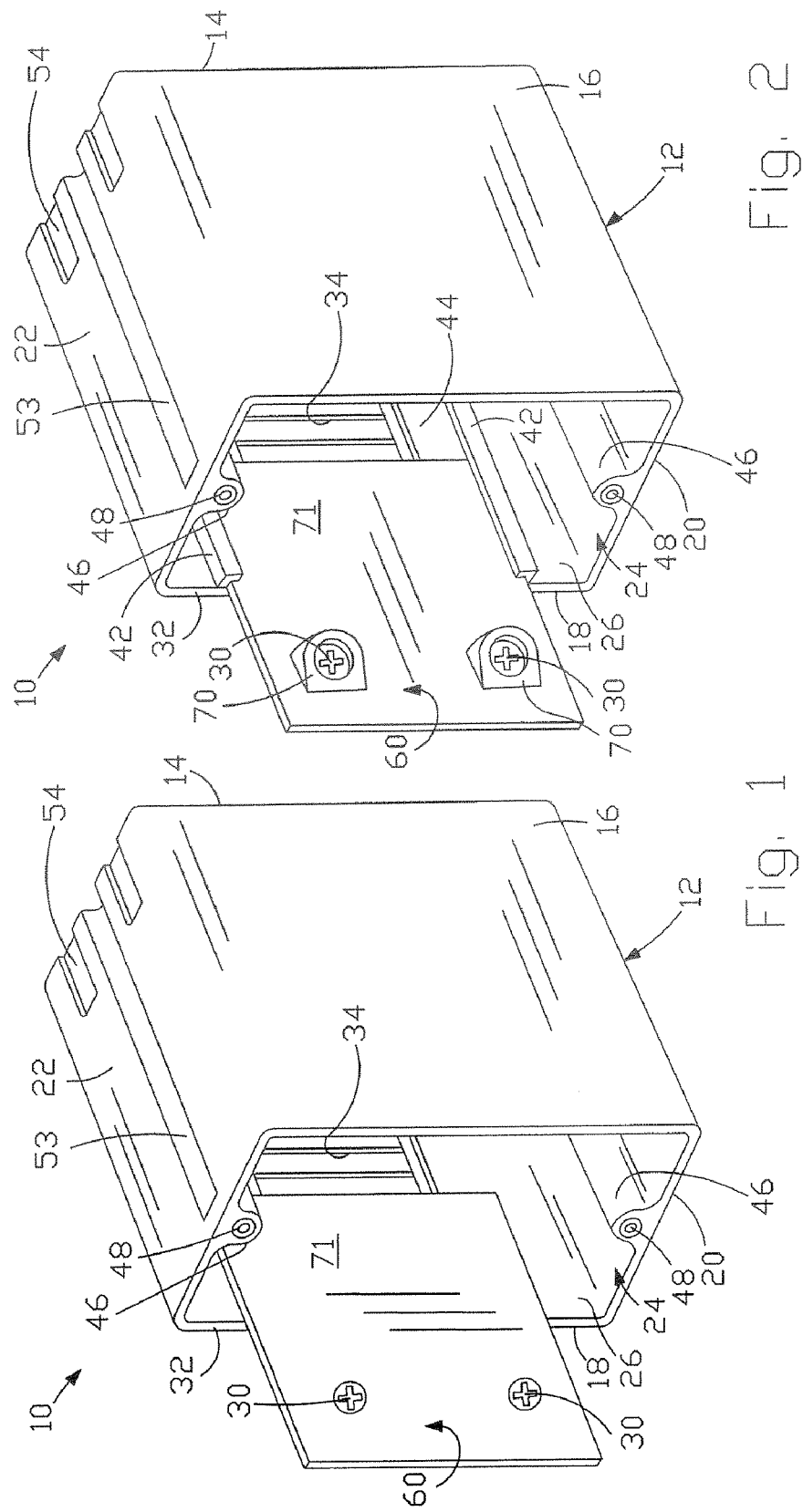

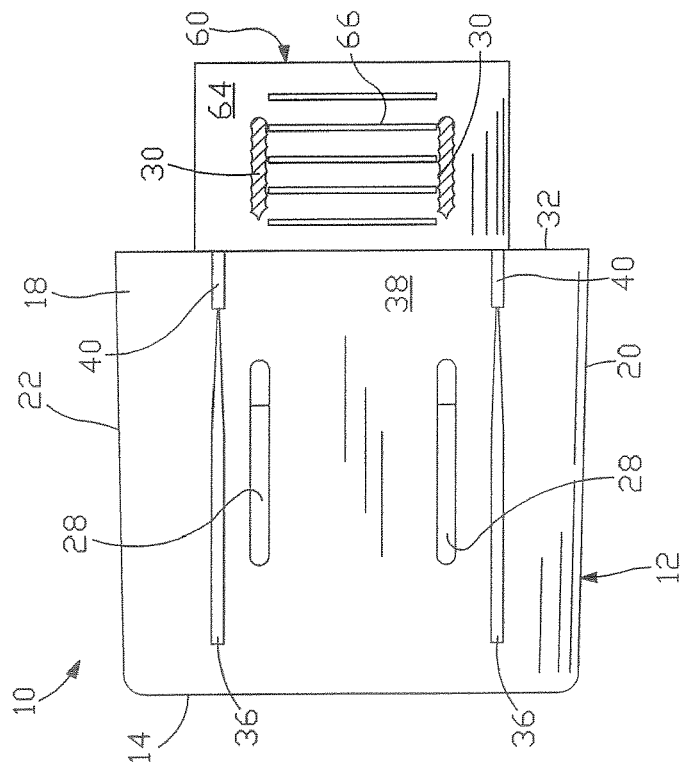
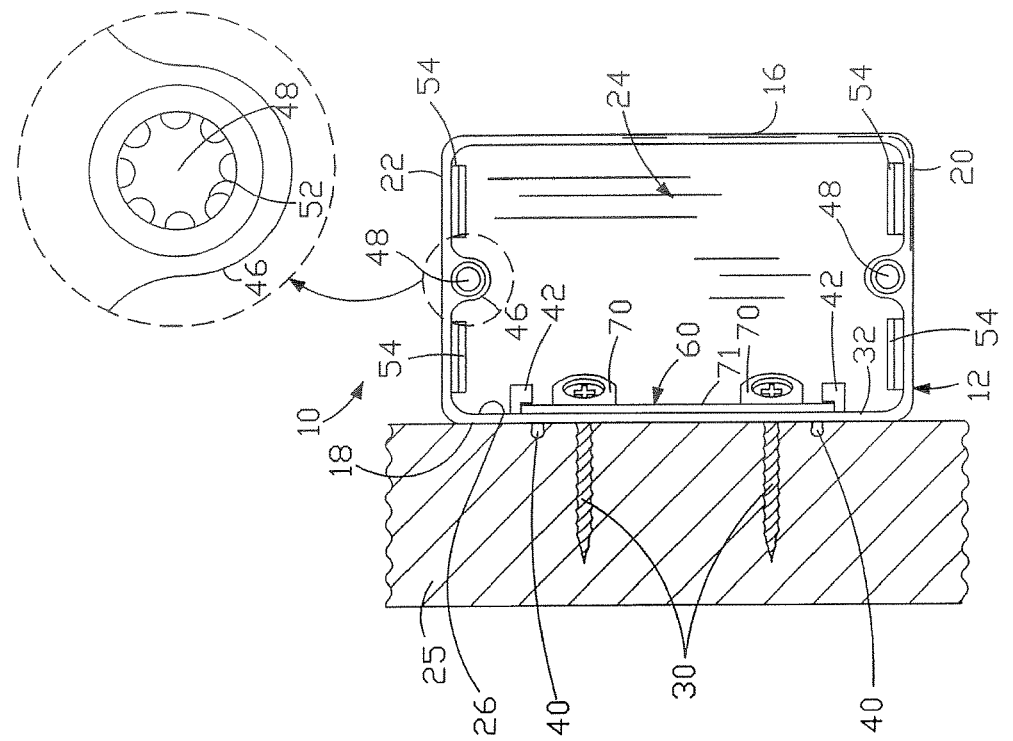

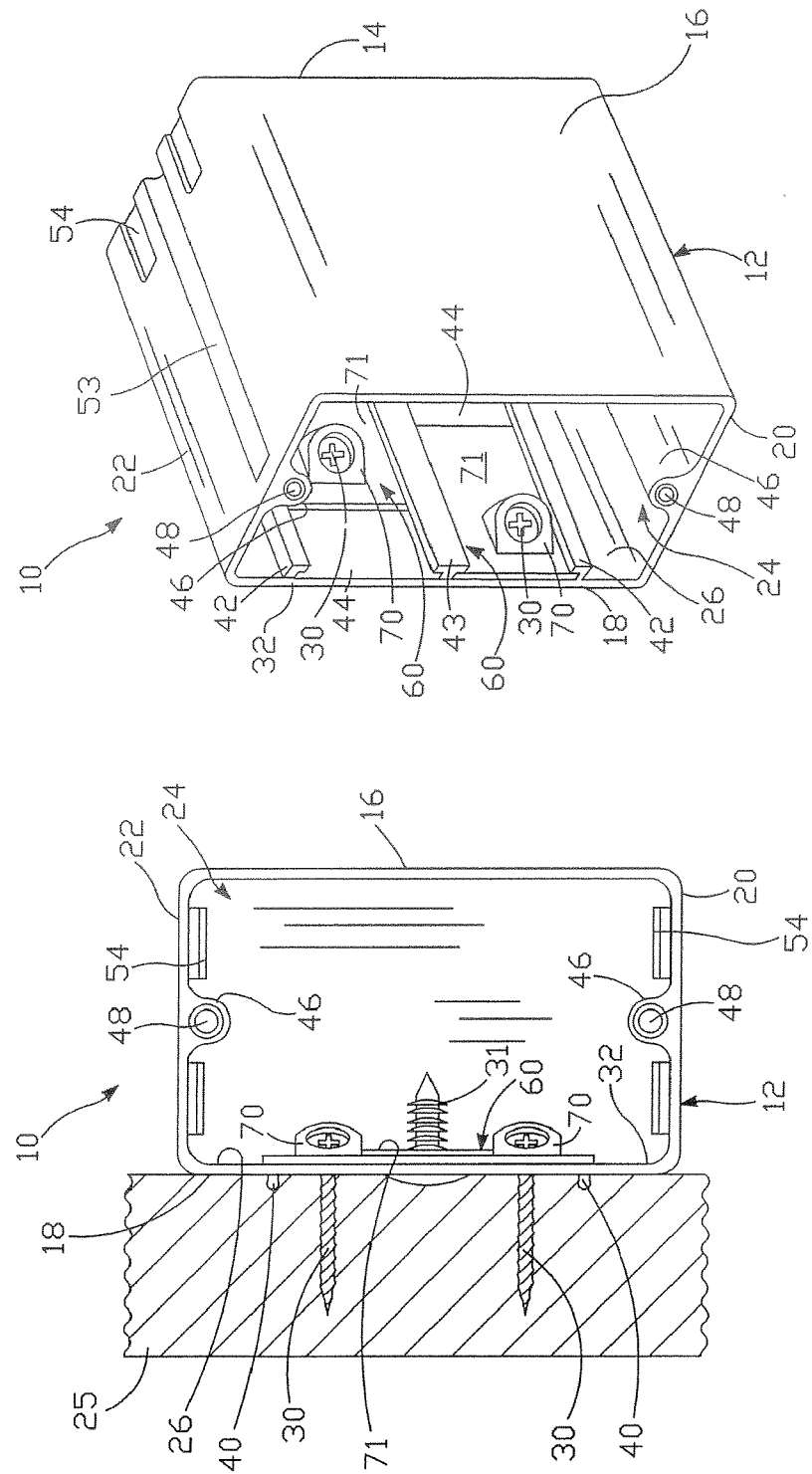

ELECTRICAL BOX WITH MOVABLE MOUNTING SYSTEM

CROSS-REFERENCE TO RELATED APPLICATION

This application claims the benefit of U.S. Provisional Patent Application Ser. No. 60/952,364 filed Jul. 27, 2007.

FIELD OF THE INVENTION

The present invention relates to an electrical box and more particularly to an electrical box having a movable mounting system that facilitates a repositioning of the electrical box.

BACKGROUND OF THE INVENTION

Typically, an electrical box is used to support and contain electrical devices and wiring in a centralized space. The electrical box protects the wiring and electrical devices contained therein from extrinsic conditions such rain, snow, and fire, for example. A cover plate can be provided to further protect the wiring and electrical devices and militate against accidental electrocution of a user. The electrical box is typically connected to a joist or other structural component of a building.

Prior art electrical boxes include mounting systems with fastening devices that facilitate a connection to mounting structures. However, if a repositioning of the electrical box is desired, the fastening devices must be completely removed from the mounting structure. The electrical box is then repositioned and the fastening devices re-fastened to the mounting structure. This typically requires the formation of additional apertures in the mounting structure. Further, the repositioning process can be time consuming.

It would be desirable to produce an electrical box including a mounting system which facilitates a repositioning of the electrical box, wherein a complexity and cost thereof are minimized, and an ease of repositioning the electrical box is maximized.

SUMMARY OF THE INVENTION

In concordance and agreement with the present invention, an electrical box including a mounting system which facilitates a repositioning of the electrical box, wherein a complexity and cost thereof are minimized, and an ease of repositioning the electrical box is maximized, has surprisingly been discovered.

In one embodiment, the electrical box comprises a hollow main body having at least one open side, the main body including at least one slot formed therein, and at least one slider member disposed within the main body and adapted to receive at least one fastener therein, wherein the fastener is adapted to be inserted through the at least one slot to secure the electrical box to a mounting structure, and wherein the at least one slider member is selectively positionable in respect of the main body to facilitate repositioning of the electrical box.

In another embodiment, the electrical box comprises a hollow main body having a rear wall, at least one sidewall, and at least one open side, wherein the at least one sidewall includes at least one slot formed therein; and at least one slider member disposed within the main body, the at least one slider member having at least one aperture formed therein, wherein the at least one aperture is adapted to receive a fastener therein, the fastener adapted to be inserted through the at least one slot to secure the electrical box to a mounting structure, and wherein the at least one slider member is selectively positionable in respect of the main body to facilitate repositioning of the electrical box.

In another embodiment, the electrical box comprises a hollow main body having a rear wall, at least one sidewall, and at least one open side, wherein the at least one sidewall includes at least one slot formed therein and at least one of a plurality of outer rails, an inner rail, and a plurality of surface irregularities formed on an inner surface thereof, and wherein at least one of the plurality of outer rails and the inner rail form at least one channel therebetween; and at least one slider member disposed within the main body, the at least one slider member including at least one aperture formed therein for receiving a fastener adapted to be inserted through the at least one slot to secure the electrical box to a mounting structure and at least one of a plurality of surface irregularities formed on an outer surface thereof, at least one boss formed on an inner surface thereof, an aperture formed therein for receiving a fastener adapted to militate against relative movement between the at least one slider member and the main body, and a fastening device formed on the outer surface thereof, wherein the at least one slider member is selectively positionable in respect of the main body to facilitate repositioning of the electrical box.

BRIEF DESCRIPTION OF THE DRAWINGS

The above, as well as other advantages of the present invention, will become readily apparent to those skilled in the art from the following detailed description of various embodiments when considered in the light of the accompanying drawings in which:

FIG. 1 is side perspective view of an electrical box including a slider member according to an embodiment of the invention;

FIG. 2 is a side perspective view of the electrical box including a slider member having at least one boss formed thereon;

FIG. 3 is a front elevational view of the electrical box illustrated in FIG. 2 including a cross-sectional view of a mounting structure;

FIG. 4 is a side elevational view of the electrical box illustrated in FIG. 2;

FIG. 5 is an enlarged detail view of a protuberance illustrated in FIG. 3 within circle 5;

FIG. 6 is a front elevational view of the electrical box illustrated in FIG. 2 including a cross-sectional view of a mounting structure, wherein a fastener is used to militate against relative movement of the slider member FIG. 7 is a side perspective view of the electrical box including a pair of slider members;

DETAILED DESCRIPTION OF THE PREFERRED EMBODIMENT

Figure 8:
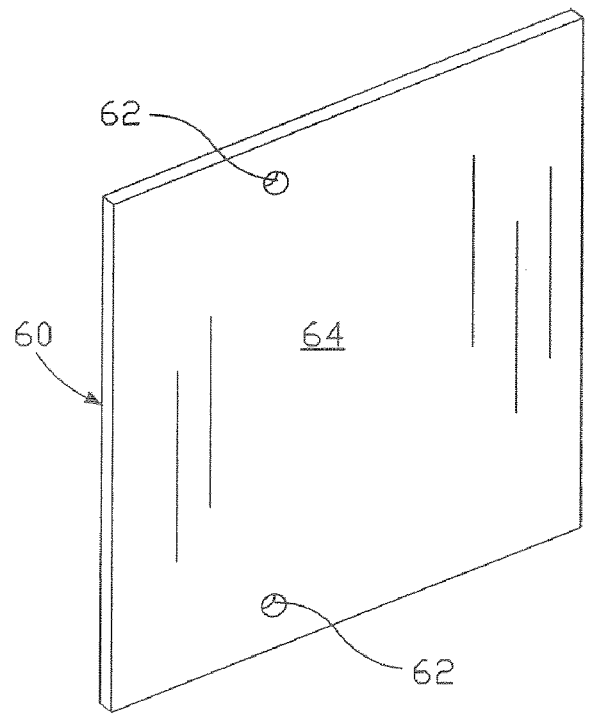
FIG. 8 is a side perspective view of the slider member illustrated in FIG. 1.

The following detailed description and appended drawings describe and illustrate various exemplary embodiments of the invention. The description and drawings serve to enable one skilled in the art to make and use the invention, and are not intended to limit the scope of the invention in any manner.

FIGS. 1 to 7 illustrate an electrical box 10 according to an embodiment of the invention. The electrical box 10 includes a hollow main body 12. Although the main body 12 shown has a generally rectangular shape, it is understood that the main body 12 can have any shape and size as desired. In the embodiment shown, the main body 12 includes a rear wall 14, a first sidewall 16, a second sidewall 18, a third sidewall 20, a fourth sidewall 22, and at least one open side defining a cavity 24 therein. It is understood that the main body 12 can include additional or fewer sidewalls as desired. The cavity 24 is adapted to receive electrical wiring, a receptacle, and the like, for example. It is understood that the electrical box 10 may be mounted in a variety of locations, wherein the electrical box 10 may be oriented in different positions.

The sidewall 18 includes a substantially planar inner surface 26 having a plurality of slots 28 formed therein, as shown in FIG. 4. Each of the slots 28 is adapted to slidably receive a fastener 30, 31, as shown in FIG. 6, therethrough. It is understood that the fasteners 30, 31 can be any conventional fastener such as a screw, a nail, a push member, and the like, for example. In the embodiment shown, the slots 28 are formed in the sidewall 18 between a front edge 32 of the sidewall 18 and the rear wall 14. It is understood that the slots 28 can be formed elsewhere in the electrical box 10 as desired. As shown in FIGS. 1 and 2, the sidewall 18 may also include a plurality of surface irregularities 34 formed on the inner surface 26 thereof. The surface irregularities 34 can be any surface irregularity as desired such as a protuberance, a rib, an indentation, and the like, for example.

A plurality of rails 36 shown in FIGS. 3, 4, and 6 may be formed on an outer surface 38 of the sidewall 18. It is understood that additional or fewer rails 36 can be formed on the outer surface 38 as desired. It is further understood that the rails 36 may be formed on the rear wall 14 and the sidewalls 16, 20, 22, as desired. Each of the rails 36 is tapered and includes a stop 40 formed at one end thereof to facilitate a leveling and a positioning of the electrical box 10 against the mounting structure 25.

The inner surface 26 of the sidewall 18 may also include at least one of a pair of outer rails 42 illustrated in FIGS. 2, 3, and 7, and an inner rail 43 illustrated in FIG. 7 formed thereon. It is understood that additional or fewer rails 42, 43 can be formed on the inner surface 26 as desired. It is further understood that the rails 42, 43 may be formed on the rear wall 14 and the sidewalls 16, 20, 22, as desired. In the embodiment shown, the rails 42, 43 extend rearwardly from the front edge 32 of the sidewall 18 to the rear wall 14 forming at least one channel 44 therebetween. As shown, the rails 42 are substantially L-shaped in cross-section and the rail 43 is substantially T-shaped in cross-section, although it is understood that the rails 42, 43 can have any cross-sectional shape as desired. The slots 28 are disposed between the rails 42 and are substantially parallel therewith.

The sidewalls 20, 22 include an inwardly extending protuberance 46 having at least one aperture 48 formed therein. The at least one aperture 48 is adapted to receive a fastener (not shown) therein. It is understood that the at least one fastener can be any conventional fastener such as a screw, a nail, and the like, for example. As shown in FIG. 5, the at least one aperture 48 may include an annular array of spline-like protuberances 52 adapted to facilitate a tightening of the at least one fastener and militate against a loosening thereof. A corresponding channel 53 for receiving the fastener may also be formed in the sidewalls 20, 22. Optionally, additional structure (not shown) such as a face plate can be mounted to the electrical box 10 and fastened to the protuberances 46.

The sidewalls 20, 22 may also include at least one removable tab 54 formed therein. It is understood that the at least one tab 54 may be formed in the rear wall 14 and the sidewalls 16, 18, as desired. It is also understood that the at least one tab 54 may have any size and shape such as rectangular, circular, semi-circular, triangular, for example, as desired. When the at least one tab 54 is removed, an aperture (not shown) adapted to receive electrical wiring, fittings, and the like, for example, is provided in the electrical box 10.

Figure 9:
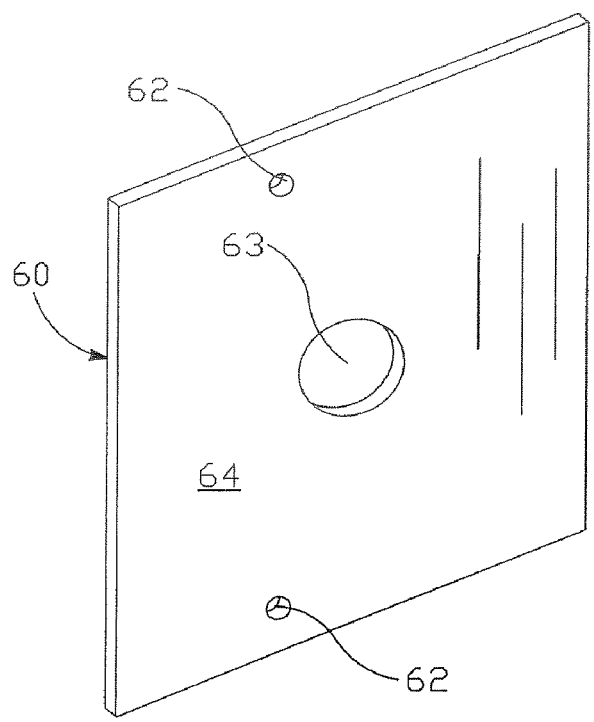
FIG. 9 is a side perspective view of the slider member illustrated in FIG. 6, wherein the slider member includes an aperture adapted to receive the fastener therein.

At least one slider member 60 is slidably received on the inner surface 26 of the sidewall 18. It is understood that the slider member 60 can also be slidably received in the channel 44 formed on the inner surface 26 of the sidewall 18. As shown in FIGS. 8 to 11, the slider member 60 includes at least one aperture 62 formed therein. It is understood that additional apertures 62 can be formed in the slider member 60 as desired. The at least one aperture 62 is adapted to receive the fastener 30 therethrough. As illustrated in FIG. 9, the slider member 60 may also include an aperture 63 formed therein. The aperture 63 is adapted to receive the fastener 31 therethrough.

Figure 10:
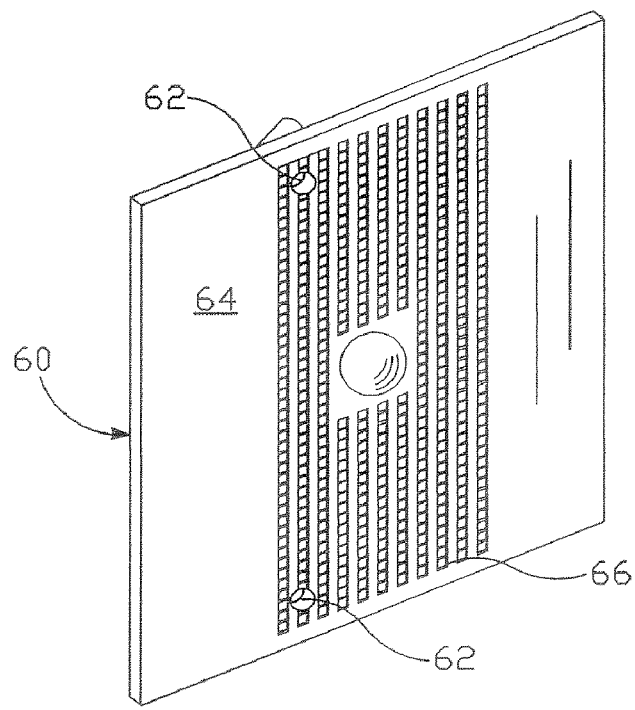
FIG. 10 is a side perspective view of the slider member illustrated in FIG. 2, wherein the slider member includes a plurality of surface irregularities formed thereon.
Figure 11:
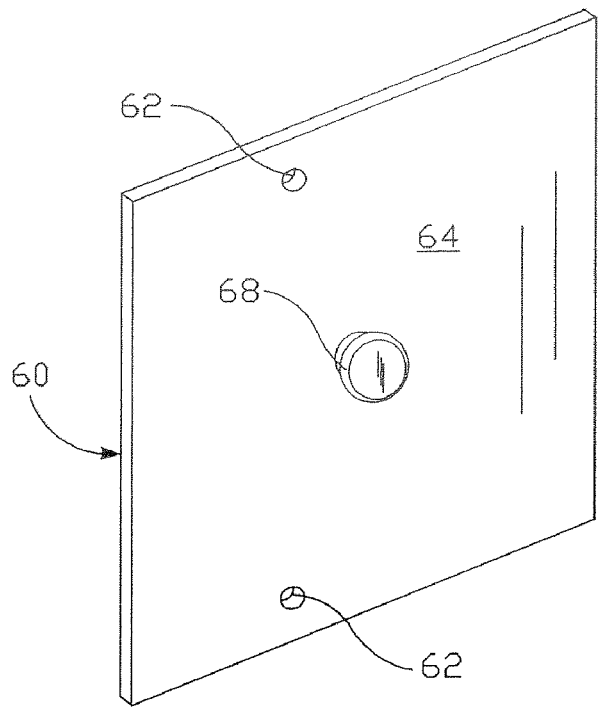
FIG. 11 is a side perspective view of the slider member including a fastening device disposed thereon.

An outer surface 64 of the slider member 60 is adapted to cooperate with one of the inner surface 26 of the sidewall 18 and the surface irregularities 34 thereof to facilitate a frictional engagement therebetween. As shown in FIG. 10, the outer surface 64 of the slider member 60 may include a plurality of surface irregularities 66 such as protuberances, ribs, indentions, and the like, for example, formed thereon. The surface irregularities 66 are adapted to cooperate with one of the inner surface 26 of the sidewall 18 and the surface irregularities 34 thereof to facilitate a frictional engagement therebetween. The outer surface 64 may also include a fastening device 68 formed thereon. The fastening device 68 shown in FIG. 11 is a protuberance such as a tab or detent, for example, although it is understood that other fastening devices can be used as desired. The fastening device 68 is adapted to be received in the slots 28 formed in the sidewall 18.

As illustrated in FIGS. 2, 3, 6, and 7, the slider member 60 may also include at least one boss 70 formed on an inner surface 71 thereof. The at least one boss 70 extends outwardly from the inner surface 71 and includes an aperture (not shown) for receiving the fastener 30 therethrough. A pair of indentations (not shown) can also be formed on the inner surface 71 of the slider member 60 opposite the fastening device 68 as desired.

In use, the at least one slider member 60 is disposed onto the inner surface 26 of the sidewall 18 so the at least one aperture 62 formed in the at least one slider member 60 aligns with the corresponding slot 28 formed in the sidewall 18. Where the sidewall 18 includes at least one of the rails 42, 43, the at least one slider member 60 is inserted into the at least one channel 44. The rails 42, 43 militate against relative lateral and rotational movement between the at least one slider member 60 and the electrical box 10. The fasteners 30 are inserted through the apertures 62 formed in the at least one slider member 60 and through the corresponding slots 28 formed in the sidewall 18. It is understood that where the slider member 60 includes the at least one boss 70, the fastener 30 is inserted into the aperture formed in the boss 70, through the at least one aperture 62 formed in the at least one slider member 60, and into and through the corresponding slot 28 formed in the sidewall 18. Where the fastener 31 is employed, the fastener 31 is inserted through the corresponding slot 28 formed in the sidewall 18 and into and through the at least one aperture 63 formed in the slider member 60. Additionally, where the fastening device 68 is formed on the slider member 60, the fastening device 68 is inserted through the corresponding slot 28 formed in the sidewall 18.

The at least one slider member 60 is then positioned in a desired position on the sidewall 18 or in the channel 44, and the electrical box 10 is affixed to the mounting structure 25 by securing the fasteners 30 thereto. When the fasteners 30 are substantially fully secured to the mounting structure 25, the slider member 60 is caused to be compressed against the inner surface 26 of the sidewall 18, thus militating against relative movement between the slider member 60 and the main body 12. Additionally, the fastener 31, the fastening device 68, and the surface irregularities 34, 66 militate against relative movement between the slider member 60 and the main body 12.

If it is desired to adjust the position of the electrical box 10 on the mounting structure 25, the fasteners 30 can be partially withdrawn from the mounting structure 25. The compressive force applied to the slider member 60 is released to permit relative movement between the slider member 60 and the main body 12. The electrical box 10 can be repositioned, and the fasteners 30 re-tightened to re-secure the electrical box 10.

The invention permits a repositioning of the electrical box 10 on the mounting structure 25 without a complete removal of the fasteners 30 from the mounting structure 25. As illustrated in FIG. 7, the inclusion of two slider members 60 permits the mounting of the electrical box 10 to additional mounting structures 25 and allows a user to re-align the electrical box 10 on the mounting structure 25. Accordingly, a difficulty and a time required to reposition the electrical box 10 on the mounting structure 25 are minimized, and a diversity of structure to which the electrical box 10 may be mounted is maximized.

Figure 12:
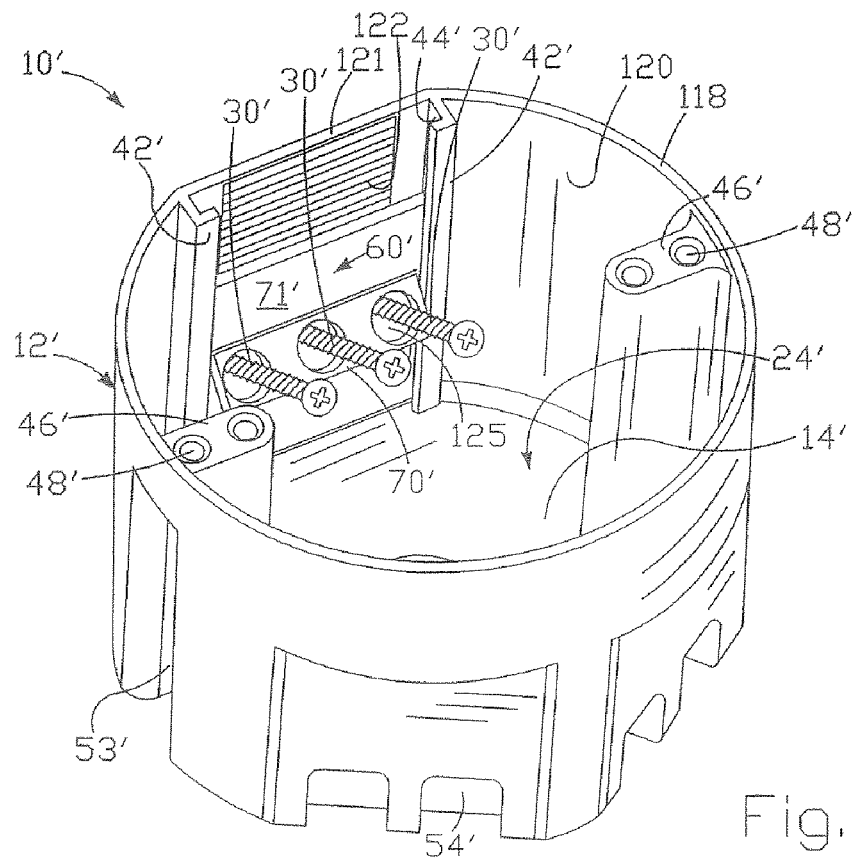
FIG. 12 is a bottom perspective view of an electrical box according to another embodiment of the invention.
Figure 13:
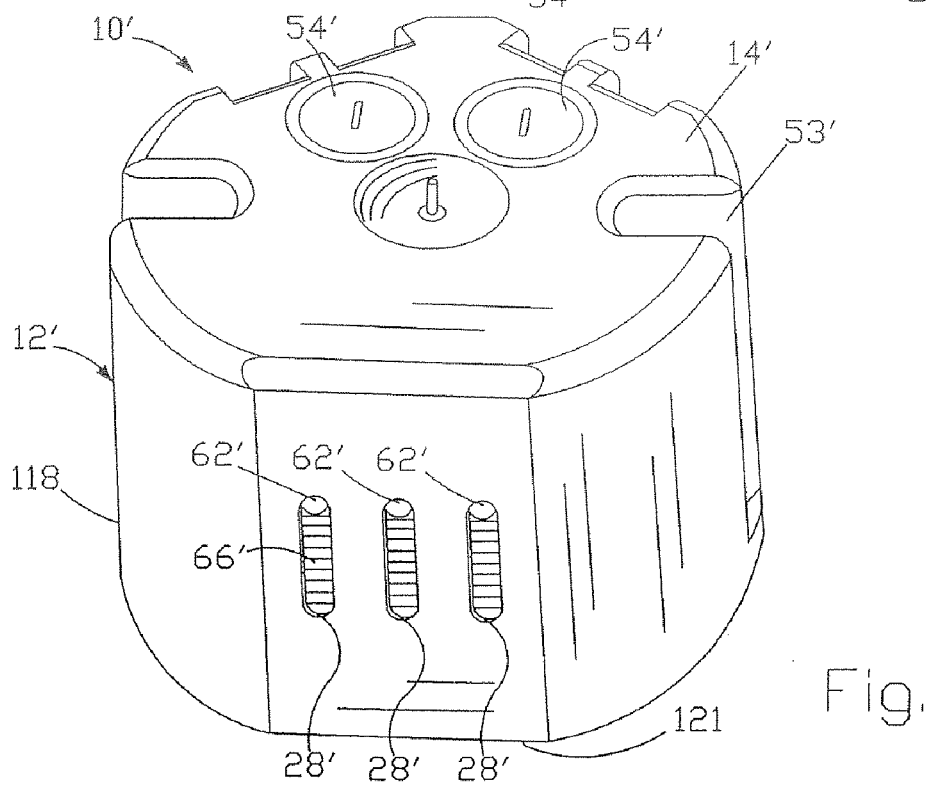
FIG. 13 is a top perspective view of the electrical box illustrated in FIG. 12.
Figure 14:
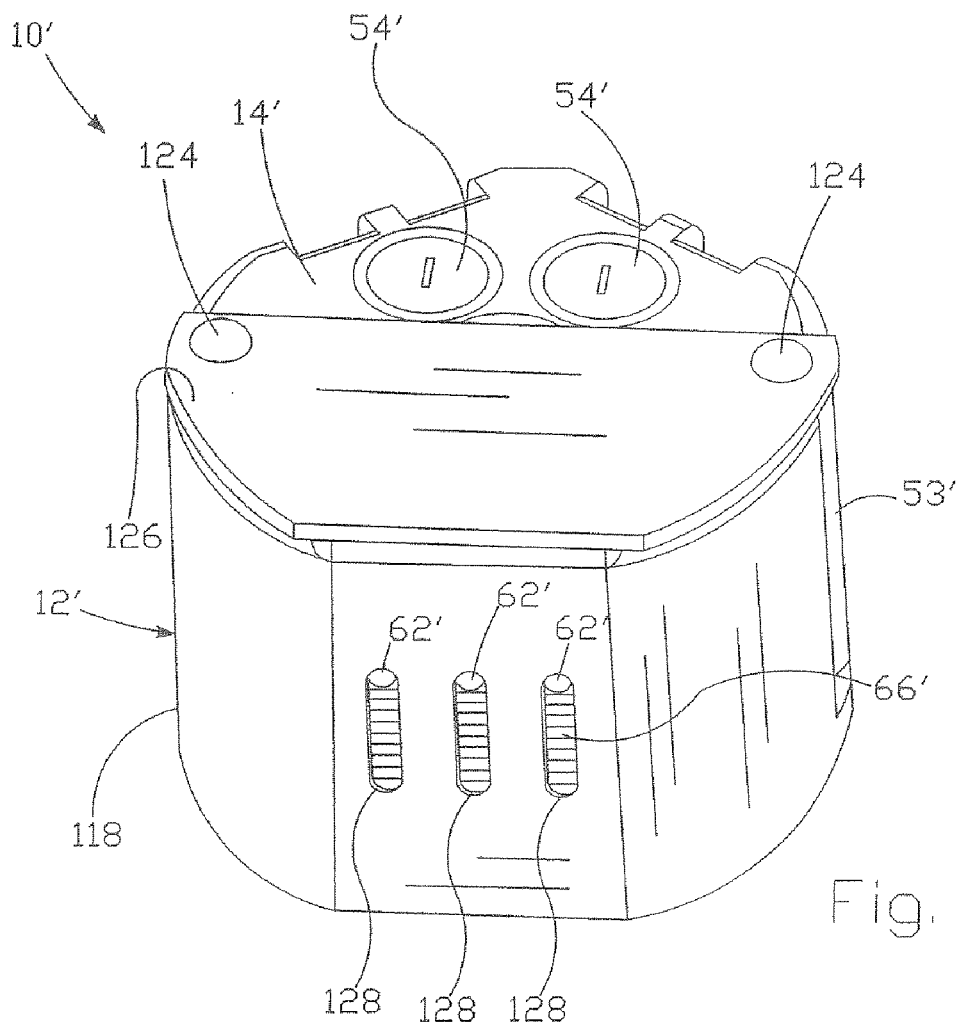
FIG. 14 is a top perspective view of the electrical box illustrated in FIGS. 12 and 13, wherein the electrical box includes a plate-like support disposed thereon.

FIGS. 12 to 14 show another embodiment of the invention which includes an electrical box 10' similar to that shown in FIGS. 1 to 10. Reference numerals for similar structure in respect of the description of FIGS. 1 to 10 are repeated in FIGS. 12 to 14 with a prime (') symbol.

The electrical box 10' includes a hollow main body 12'. Although the main body 12' shown has a generally circular shape, it is understood that the main body 12' can have any shape and size as desired. In the embodiment shown, the main body 12' includes a rear wall 14', a sidewall 118, and at least one open side defining a cavity 24' therein. It is understood that the main body 12' can include additional or fewer sidewalls as desired. The cavity 24' is adapted to receive electrical wiring, a receptacle, and the like, for example. It is understood that the electrical box 10' may be mounted in a variety of locations, wherein the electrical box 10' may be oriented in different positions.

The sidewall 118 includes a substantially planar inner surface 120 having a plurality of slots 28' formed therein. Each of the slots 28' is adapted to slidably receive a fastener 30' therethrough. It is understood that the fastener 30' can be any conventional fastener such as a screw, a nail, a push member, and the like, for example. As shown in FIG. 13, the slots 28' are formed in the sidewall 118 between a front edge 121 of the sidewall 118 and the rear wall 14'. It is understood that the slots 28' can be formed elsewhere in the electrical box 10' as desired.

The inner surface 120 of the sidewall 118 may also include a plurality of surface irregularities 122 and at least one of a pair of outer rails 42' and an inner rail (not shown) formed thereon. It is understood that the surface irregularities 122 can be any surface irregularity as desired such as a protuberance, a rib, an indentation, and the like, for example. In the embodiment shown, the rails 42' extend from the front edge 121 of the sidewall 118 to the rear wall 14', forming a channel 44' therebetween. The rails 42' are substantially L-shaped in cross section. It is understood that the rails 42' can have any shape such as a T-shaped cross-section, as desired. It is further understood that additional or fewer rails 42' can be formed on the inner surface 120, as desired. The slots 28' are disposed between the rails 42' and are substantially parallel therewith.

The sidewall 118 also includes a plurality of inwardly extending protuberances 46' having at least one aperture 48' formed therein. The at least one aperture 48' is adapted to receive a fastener (not shown) therein. It is understood that the fastener can be any conventional fastener such as a screw, a nail, and the like, for example. It is further understood that the fastener may be a fastener 124 shown in FIG. 14 if desired. The at least one aperture 48' may include an annular array of spline-like protuberances (not shown) adapted to facilitate a tightening of the fastener and militate against a loosening thereof. A plurality of corresponding channels 53' may also be formed in the sidewalls 118. The channels 53' are adapted to receive the fastener therein. Optionally, additional structure (not shown) such as a face plate can be mounted to the electrical box 10' and fastened to the protuberances 46'.

The sidewall 118 and rear wall 14' may also include at least one removable tab 54' formed therein. It is understood that the at least one tab 54' may have any size and shape such as rectangular, circular, semi-circular, triangular, for example, as desired. When the at least one tab 54' is removed, an aperture (not shown) adapted to receive electrical wiring, fittings, and the like, for example, is provided in the electrical box 10'.

At least one slider member 60' is slidably received on the inner surface 120 of the sidewall 118. It is understood that the slider member 60' can also be slidably received in the channel 44' formed on the inner surface 120 of the sidewall 118. The slider member 60' includes at least one aperture 62'. The at least one aperture 62' is adapted to receive the fastener 30' therethrough.

An outer surface of the slider member 60' is adapted to cooperate with one of the inner surface 120 of the sidewall 118 and the surface irregularities 122 of the sidewall 118 to facilitate a frictional engagement therebetween. As shown in FIGS. 13 and 14, the outer surface of the slider member 60' may include a plurality of surface irregularities 66' such as protuberances, ribs, indentions, and the like, for example, formed thereon. The surface irregularities 66' are adapted to cooperate with one of the inner surface 120 of the sidewall 118 and the surface irregularities 122 of the sidewall 118 to facilitate a frictional engagement therebetween The slider member 60' may also include at least boss 70' formed on an inner surface 71' thereof. The at least one boss 70', as shown in FIG. 12, extends outwardly from the inner surface 71' and includes at least one aperture 125 for receiving the fastener 30' therethrough.

As illustrated in FIG. 14, a plate-like support 126 may be disposed on the main body 12'. The support 126 includes at least one aperture (not shown) and a plurality of slots 128 formed therein. The at least one aperture is adapted to receive the fastener 124 therethrough to affix the support 126 to the main body 12'. It is understood that the support 126 can include additional apertures as desired. The slots 128 are adapted to substantially align with the slots 28' of the sidewall 118 and receive the fasteners 30' therethrough. The support 126 is substantially L-shaped in cross-section and abuts a portion of the rear wall 14' and a portion of the sidewall 118. The support 126 is adapted to provide stability and integrity o the main body 12' of the electrical box 10' such as providing sufficient strength to support a ceiling fan, for example.

In use, the at least one slider member 60' is disposed onto the inner surface 120 of the sidewall 118 so the at least one aperture 62' formed in the at least one slider member 60' aligns with the corresponding slot 28' formed in the sidewall 118. Where the sidewall 118 includes at least one of the outer rails 42' and the inner rail, the at least one slider member 60' is inserted into the at least one channel 44'. The outer rails 42' and the inner rail militate against relative lateral and rotational movement between the at least one slider member 60' and the electrical box 10'. The fasteners 30' are inserted through the apertures 62' formed in the at least one slider member 60' and through the corresponding slots 28' formed in the sidewall 118. It is understood that where the slider member 60' includes the at least one boss 70', the fastener 30' is inserted into the aperture 125 formed in the boss 70', through the at least one aperture 62' formed in the at least one slider member 60', and into and through the corresponding slot 28' formed in the sidewall 118. Further, where the main body 12' includes the support 126 disposed thereon, the fasteners 30' are inserted into the apertures 125 formed in the boss 70', through the apertures 62' formed in the at least one slider member 60' and the corresponding slot 28' formed in the sidewall 118, and into and through the corresponding slot 128 of the support 126.

The at least one slider member 60' is then positioned in a desired position on the sidewall 118 or in the channel 44', and the electrical box 10' is affixed to the mounting structure by securing the fasteners 30' to the mounting structure. When the fasteners 30' are substantially fully secured to the mounting structure, the slider member 60' is caused to be compressed against the inner surface 120 of the sidewall 118, thus militating against relative movement between the slider member 60' and the main body 12'. Additionally, the surface irregularities 66', 122 militate against relative movement between the slider member 60' and the main body 12'.

If it is desired to adjust the position of the electrical box 10' on the mounting structure, the fasteners 30' can be partially withdrawn from the mounting structure. The compressive force applied to the slider member 60' is released to permit relative movement between the slider member 60' and the main body 12'. The electrical box 10' can be repositioned, and the fasteners 30' re-tightened to re-secure the electrical box 10'.

The invention permits a repositioning of the electrical box 10' on the mounting structure without a complete removal of the fasteners 30' from the mounting structure. The inclusion of two slider members 60' permits the mounting of the electrical box 10' to additional mounting structures and allows a user to re-align the electrical box 10' on the mounting structure. Accordingly, a difficulty and a time required to reposition the electrical box 10, on the mounting structure are minimized, and a diversity of structure to which the electrical box 10' may be mounted is maximized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box comprising:
   a hollow main body having at least one wall and at least one open side defining a cavity therein, the main body including at least one elongate slot formed in the at least one wall; and at least one slider member disposed within the cavity of the main body in contact with the main body, the at least one slider member adapted to receive at least one fastener therein, wherein the fastener is adapted to be inserted through the at least one slot to permit relative movement between the slider member and the main body and secure the electrical box to a mounting structure, and wherein the at least one slider member is selectively positionable in respect of the main body to facilitate repositioning of the electrical box.

2. The electrical box according to claim 1, wherein the hollow main body includes at least one of an inner rail and a plurality of outer rails formed on an inner surface thereof to form at least one channel therebetween to receive the at least one slider member therein.

3. The electrical box according to claim 1, wherein the hollow main body includes a plurality of surface irregularities formed on an inner surface thereof.

4. The electrical box according to claim 1, wherein the at least one slider member includes at least one aperture formed therein for receiving the fastener therein.

5. The electrical box according to claim 1, wherein the at least one slider member includes a plurality of surface irregularities fanned on an outer surface thereof.

6. The electrical box according to claim 1, wherein the at least one slider member includes at least one boss formed on an inner surface thereof for receiving the fastener therein.

7. The electrical box according to claim 1, wherein the at least one slider member includes an aperture formed therein for receiving a fastener therein, the fastener adapted to militate against relative movement between the at least one slider member and the main body.

8. The electrical box according to claim 1, wherein the at least one slider member includes a fastening device formed on an outer surface thereof.

9. The electrical box according to claim 1, wherein the hollow main body includes a plate-like support disposed thereon.

10. An electrical box comprising:
    a hollow main body having a rear wall, at least one sidewall, and at least one open side defining a cavity therein, wherein the at least one sidewall includes at least one slot formed therein; and at least one slider member disposed within the cavity of the main body in contact with the main body, the at least one slider member having at least one aperture formed therein, wherein the at least one aperture is adapted to receive a fastener therein, the fastener adapted to be inserted through the at least one slot to permit relative movement between the slider member and the main body and secure the electrical box to a mounting structure, and wherein the at least one slider member is selectively positionable in respect of the main body to facilitate repositioning of the electrical box, and wherein at least one of an inner surface of the at least one sidewall and an outer surface of the at least one slider member includes a plurality of surface irregularities formed thereon.

11. The electrical box according to claim 10, wherein the at least one sidewall of the hollow main body includes at least one of an inner rail and a plurality of outer rails formed on the inner surface thereof to form at least one channel therebetween to receive the at least one slider member therein.

12. The electrical box according to claim 10, wherein the at least one slider member includes at least one boss formed on an inner surface thereof for receiving the fastener therein.

13. The electrical box according to claim 10, wherein the at least one slider member includes an aperture formed therein for receiving a fastener therein, the fastener adapted to militate against relative movement between the at least one slider member and the main body.

14. The electrical box according to claim 10, wherein the at least one slider member includes a fastening device formed on the outer surface thereof.

15. The electrical box according to claim 10, wherein a portion of the rear wall and a portion of the at least one sidewall of the hollow main body include a plate-like support disposed thereon.

16. An electrical box comprising:
   a hollow main body having a rear wall, at least one sidewall, and at least one open side, wherein the at least one sidewall includes at least one slot formed therein and at least one of a plurality of outer rails, an inner rail, and a plurality of surface irregularities formed on an inner surface thereof, and wherein at least one of the plurality of outer rails and the inner rail form at least one channel therebetween; and
   at least one slider member disposed within the main body, the at least one slider member including at least one aperture formed therein for receiving a fastener adapted to be inserted through the at least one slot to secure the electrical box to a mounting structure and at least one of a plurality of surface irregularities formed on an outer surface thereof, at least one boss formed on an inner surface thereof, an aperture formed therein for receiving a fastener adapted to militate against relative movement between the at least one slider member and the main body, and a fastening device formed on the outer surface thereof, wherein the at least one slider member is selectively positionable in respect of the main body to facilitate repositioning of the electrical box.

17. The electrical box according to claim 16, wherein a portion of the rear wall and a portion of the at least one sidewall of the hollow main body include a plate-like support disposed thereon.

18. The electrical box according to claim 16, wherein the hollow main body includes at least one of a plurality of protuberances formed on an inner surface thereof, a channel formed therein, at least one tab formed therein, and a plurality of rails formed on an outer surface thereof, the protuberances having at least one aperture formed therein.

* * * * *